CHARLES WINSLOW.
Elastic Goring for Boots and Shoes.
No. 124,527.  Patented March 12, 1872.
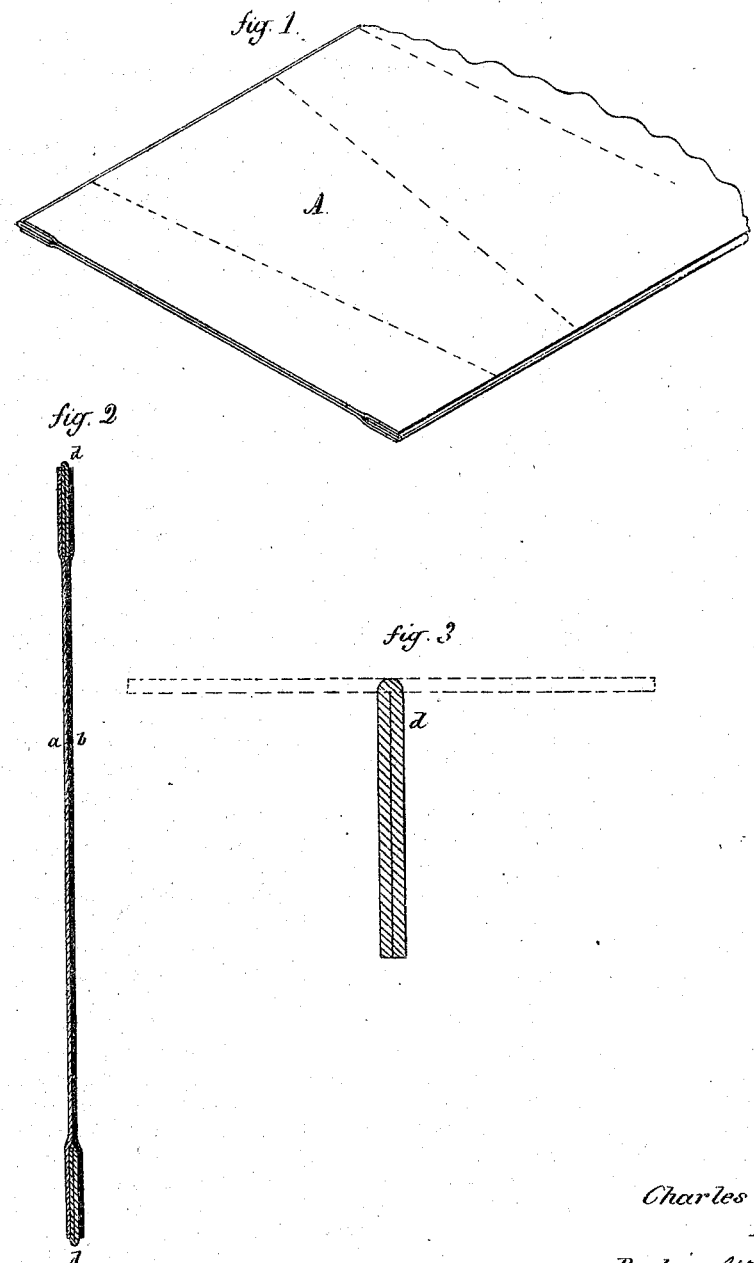

124,527

UNITED STATES PATENT OFFICE.

CHARLES WINSLOW, OF BOSTON, MASSACHUSETTS.

IMPROVEMENT IN ELASTIC GORINGS FOR BOOTS AND SHOES.

Specification forming part of Letters Patent No. 124,527, dated March 12, 1872.

*To all whom it may concern:*

Be it known that I, CHARLES WINSLOW, of Boston, in the county of Suffolk and State of Massachusetts, have invented a new Improvement in Elastic Goring for Boots and Shoes; and I do hereby declare the following, when taken in connection with the accompanying drawing and the letters of reference marked thereon, to be a full, clear, and exact description of the same, and which said drawing constitutes part of this specification, and represents, in—

Figure 1, a perspective view of the article complete, ready for market; Fig. 2, a transverse section to illustrate the manner of construction; and in Fig. 3, a transverse section of the intermediate edge, enlarged.

This invention relates to an improvement in the manufacture of elastic goring for boots and shoes, the goring being made from two elastic fabrics. The object of the invention is to protect and strengthen the edge, and still retain at that point the required elasticity; and it consists in the introduction between the edges of two fabrics (both made elastic by the introduction of rubber between them) of an elastic material, substantially such as patented to me August 4, 1857, (the said patent consisting of a fabricated material doubled, the threads of which are out of parallelism with either the warp or weft, or otherwise, so as to allow the stretching of the fabric, this fabric so coated or filled with India rubber, or rubber compound that the natural elasticity of the rubber will return it to its original position;) and the said materials so combined are finished by the process of vulcanization, making, when complete, an article of manufacture, from which the gores may be cut, one edge making the upper edge of each alternate gore. The said intermediate fabricated portion of the rubber serves to protect and strengthen the edge of the fabric.

The width of the article A corresponds to the width of the gore desired. The two fabrics *a b* are made elastic by so cutting a woven fabric that the threads will be diagonal, as in the patent of Tyer and Helm, dated May 6, 1856, or by any other fabrication of material which will allow it to stretch. Between these two fabrics, one of which is to form the outside and the other the inside, a coating of India rubber or rubber compound while in a plastic state is applied, and between the fabrics at each edge the binding edge or stay is introduced. The edge is made by using a diagonal fabric, such as before referred to, as my patent of August 4, 1857, or other fabricated material which will allow the required stretching. This is also coated or thoroughly impregnated with India rubber and doubled as in Fig. 3; thus doubled, it is placed between the two fabrics, as in Fig. 2, the edges of the two fabrics being pressed hard down thereon so as to adhere firmly thereto, and the two fabrics pressed together are then submitted to the ordinary process of vulcanization, which completes the article ready for market, in strips varying in length and in width according to the style of shoe for which the goring is intended. This article the consumer receives and cuts the gores therefrom, substantially as indicated by the diagonal broken lines in Fig. 1, the upper edge of the alternate gores being cut from opposite edges of the fabric.

The edge of the fabric without the introduction of the stay *d* is liable to tear or break away and soon destroy the gore. The use of this intermediate part or stay *d* strengthens the gore at that point, so that the liability to break or tear, if not entirely removed, is, to a great extent, prevented.

I claim as my invention—

As an article of manufacture, the herein-described elastic goring for boots and shoes, consisting of two surfaces of elastic fabric having an elastic material introduced between the two edges, and their meeting surfaces coated with a vulcanizable rubber compound, and the article completed by the process of vulcanization, substantially as described.

CHARLES WINSLOW.

Witnesses:
   A. J. TIBBITS,
   J. H. SHUMWAY.